United States Patent [19]

Lopes

[11] Patent Number: 4,761,443

[45] Date of Patent: Aug. 2, 1988

[54] MULTIPLE RELEASE MOLD COATING FOR HIGH WATER, HIGH RESILIENCY POLYURETHANE FOAM

[75] Inventor: William J. Lopes, Midland, Mich.

[73] Assignee: Dow Corning Corporaton, Midland, Mich.

[21] Appl. No.: 58,203

[22] Filed: Jun. 4, 1987

[51] Int. Cl.[4] .................................................. C08K 5/15
[52] U.S. Cl. .................................... 524/110; 524/113; 524/315; 524/465; 524/473; 524/490; 524/588; 524/861; 528/17; 528/18; 528/31; 264/338
[58] Field of Search ................... 264/338; 528/31, 17, 528/18; 524/588, 861, 110, 113, 315, 465, 473, 490

[56] References Cited

U.S. PATENT DOCUMENTS

| | | | |
|---|---|---|---|
| 4,244,912 | 1/1981 | Battice | 264/338 |
| 4,461,851 | 7/1984 | Hashimoto | 528/31 |
| 4,534,928 | 8/1985 | Martin | 264/334 |
| 4,535,123 | 8/1985 | Sasaki et al. | 528/31 |
| 4,569,980 | 2/1986 | Sasaki et al. | 528/31 |
| 4,681,714 | 7/1987 | Lopes et al. | 528/18 |

FOREIGN PATENT DOCUMENTS 624114 7/1961 Canada.

*Primary Examiner*—Melvyn I. Marquis
*Attorney, Agent, or Firm*—Alexander Weitz

[57] ABSTRACT

A method for molding high water, high resiliency (HR) polyurethane foam articles is disclosed wherein a silicone mold release composition is used to treat the surfaces of a mold. The composition imparts release characteristics to the mold which last through multiple molding cycles, allow recoating with said composition and allows the production of defect-free foam articles. The composition consists essentially of a high and a low molecular weight hydroxyl endblocked polydimethylsiloxane, a siloxane crosslinker having SiH functionality, a catalyst and an inert solvent.

7 Claims, No Drawings

MULTIPLE RELEASE MOLD COATING FOR HIGH WATER, HIGH RESILIENCY POLYURETHANE FOAM

FIELD OF THE INVENTION

This invention relates to a method of treating the shape determining faces of molds to render the molds relatively nonadhesive to the molded articles formed therein. The compositions used in the method of the invention comprise a blend of high and low molecular weight hyrdroxyl endblocked polydimethylsiloxanes, a siloxane crosslinker for the polydimethylsiloxanes, a catalyst and an inert organic solvent. When cured, the compositions are particularly useful in molding high water, high resiliency polyurethane foam articles by providing a nonreactive release coating on the surface of the shape determining portion of the mold. This allows the treated mold to release molded articles through multiple molding cycles and does not defoam the surface of the molded polyurethane foam articles.

BACKGROUND OF THE INVENTION

High resiliency (HR) polyurethane foams are open-celled structures known to have excellent physical properties such as low flex fatigue, low flammability and good load bearing characteristics. As such, they find extensive application in the fabrication of cushioning components in the furniture and automotive industries. These foams are produced by reacting high molecular weight polyols which contain a large proportion of primary hydroxyl groups with organic isocyanates and a blowing agent. When the blowing agent in such a formulation is water, it reacts with some of the isocyanate to form carbon dioxide gas for the foaming system. Thus, in order to achieve the low density foams required for automotive applications, for example, HR polyurethane foam compositions have been formulated with more water than earlier systems. These are designated in the art as "high water" HR polyurethane foam formulations and typically employ more than 4 parts by weight of water per 100 parts of the polyol. Foam density obtained from these compositions is generally below 2 lbs./cubic foot and typically in the range of 1.50 to 1.75 lbs./cubic foot.

In the commercial practice of molding polyurethane foam formulations into shaped articles, a mold, typically aluminum, is coated with a release agent before the foam formulation is introduced and subsequently cured in the mold. This procedure allows facile removal of the cured part without attendant tearing or other damage. A large number of cured as well as uncured silicone coatings are known in the art to act as useful release agents in such applications and the cured coatings typically can provide multiple release of up to about 25–30 shaped articles before recoating of the mold with additional release agent is necessary. However, the above described high water HR polyurethane foam formulations are particularly unstable and each of the currently available release agents has at least one shortcoming which makes its use less than satisfactory in such foaming systems.

Thus, for example, Oppliger, Canadian Patent No. 624,114, teaches that cured films of polysiloxane oils or gums act as release coatings in polyurethane foam molding applications. Oppliger does not teach that these films give multiple releases and the examples and the compositions taught in Opplinger in fact do not give multiple releases of molded high water HR polyurethane foam articles.

U.S. Pat. No. 4,244,912 issued to Battice teaches that a composition comprised of vinyl end-blocked polydimethylsiloxane, vinyl group containing polysiloxane resin, polymethylhydrogensiloxane cross-linking agent, and a platinum containing hydrosilation catalyst is useful as a multiple release coating. This coating does allow multiple releases of molded high water HR polyurethane foam articles and does not defoam the surface of such articles. The coating is difficult to recoat, however, because the platinum-catalyzed cure system is inhibited by the polyurethane foam formulations. Therefore, providing new cured coatings over spent coatings is difficult to ensure in practice.

U.S. Pat. No. 4,534,928 issued to Martin teaches multiple release coatings for polyurethane foam molding applications comprised of predominantly hydroxyl terminated polydimethylsiloxanes, trialkoxysilane, metal alkoxides and nonreactive organic solvent. This composition is applied to a mold surface, the solvent is driven off and a cured film is formed which has multiple release properties. The cured coating tends to defoam high water HR polyurethane foam formulations to the extent that a "skin" of increased density forms on the surface of the foamed article where it comes into contact with the release coating. Moreover, the resultant molded articles show serious surface defects.

Lopes et al., in U.S. Pat. No. 4,681,714, Ser. No. 813,886, filed Dec. 27, 1985, and assigned to the assignee of this invention, teach a durable release composition comprising a hydroxyl endblocked polydimethylsiloxane, an alkyltriacetoxysilane, a non-reactive solvent and, optionally, an organometallic catalyst. Cured coatings based on these compositions do provide good multiple release for low water (i.e., less than 4 parts by weight of water per 100 parts of polyol) HR polyurethane foam compositions. When using a high water HR polyurethane foam formulation, however, these coatings result in an unacceptable molded surface characterized by profuse surface defects measuring approximately 3–4 foam cells in depth and 6–10 cells across designated in the art as "pitting."

SUMMARY OF THE INVENTION

It has now been discovered that the above described high water HR polyurethane foam formulations can be used to produce defect-free molded articles when the mold employed is first coated with certain silicone mold release compositions based on a mixture of hydroxyl endblocked polydimethylsiloxanes and cured with a methylhydrogen polysiloxane. The cured coatings prepared according to the present invention also permit multiple releases of the high water HR polyurethane foam molded articles before reapplication of the mold release composition is needed. Furthermore, the cured coatings do not defoam the high water HR polyurethane foam formulations and they may be readily recoated with additional mold release composition when the coating no longer provides effective release of the molded article.

Thus, the present invention relates to a method for molding a foamed article comprising placing a high water, high resiliency polyurethane molding formulation in a mold, converting the molding formulation to said foamed article and thereafter separating said foamed article from the mold, the improvement comprising applying a silicone mold release composition to at least one shape-determining surface of the mold and thereafter curing the silicone mold release composition, before the molding formulation is placed in contact therewith, wherein the silicone mold release composition consists essentially of:

(i) a hydroxyl endblocked polydimethylsiloxane having a molecular weight of about 20,000 to 500,000:
(ii) a hydroxyl endblocked polydimethylsiloxane having a molecular weight of about 1,000 to 5,000, the ratio of (i) to (ii) being about 3:1 to 19:1;
(iii) a siloxane crosslinker having, on average, at least three SiH groups per molecule and selected from siloxanes having the formulae $R_2R'SiO(Me_2SiO)_m(HMeSiO)_nSiR'R_2$ or $R_2R'SiO(HMeSiO)_nSiR'R_2$ wherein in each formula Me denotes the methyl radical, R is an alkyl group having 1 to 8 carbon atoms or the phenyl radical, R' is R or hydrogen, m is 1 to about 150 and n is 1 to about 50, said crosslinker being present in such proportion so as to provide an approximate stoichiometric equivalence of SiH functionality for reacting with the total of the hydroxyl functionality provided by components (i) and (ii):
(iv) sufficient condensation catalyst to promote reaction of (i) and (ii) with (iii): and
(v) an inert organic solvent, said mold release composition containing from about 5 to 95 weight percent of said solvent. This invention further relates to the above described composition.

DETAILED DESCRIPTION OF THE INVENTION

This invention relates to novel compositions of curable organosilicone and to the use of films formed by curing said urethane foam formulations. The compositions, when used to coat shape determining surfaces of molds, allow molded articles to be easily removed from the mold after completion of the molding process.

The polydimethylsiloxane (i) of the mold release composition is a hydroxyl endblocked polymer preferably represented by the average general formula $HOR_2Si(Me_2SiO)_jSiR_2OH$ in which Me denotes the methyl radical and R is an alkyl radical having 1 to 8 carbon atoms or the phenyl radical. The molecular weight of this component is between about 20,000 and 500,000. Although component (i) is described as a polydimethylsiloxane, up to about 10 mole percent of siloxane units containing alkyl groups having 2 to 8 carbon atoms, phenyl groups or trifluoropropyl groups may be copolymerized with the dimethylsiloxane units to still be within the scope of this invention. Thus, copolymers of dimethylsiloxane units with phenylmethylsiloxane. methylhexylsiloxane or methyltrifluoropropylsiloxane units are specific examples of this component. It is preferred that component (i) be the homopolymer dimethylpolysiloxane wherein all R groups are methyl. It is further preferred that the molecular weight of component (i) is 20,000 to 100,000, most preferably about 50,000.

Likewise, polydimethylsiloxane (ii) of the mold release composition is a hydroxyl endblocked polymer preferably represented by the average general formula $HOR_2Si(Me_2SiO)_kSiR_2OH$ wherein R and Me have their above defined meanings. The molecular weight of this component is between about 1,000 and 5,000. As in the case of component (i) above, up to about 10 mole percent of siloxane units containing alkyl groups having 2 to 8 carbon atoms, phenyl groups, or trifluoropropyl groups may be copolymerized with the dimethylsiloxane units of component (ii). It is preferred that component (ii) be the homopolymer dimethylpolysiloxane wherein all R groups are methyl. It is further preferred that the molecular weight of component (ii) is 2,000 to 3,000, most preferably about 2500.

For the purposes of this invention, the weight ratio of component (i) to component (ii) may range from about 3:1 to 19:1. Preferably, this ratio is 4:1 to 9:1, most preferably about 5.7:1.

The siloxane crosslinker (component iii) is a linear siloxane containing, on average, at least three silicon-bonded hydrogens per molecule (i.e., SiH groups). This crosslinker may be selected from siloxanes having the formulae $R_2R'SiO(Me_2SiO)_m(HMeSiO)_nSiR'R_2$ or $R_2R'SiO(HMeSiO)_nSiR'R_2$ wherein in each formula Me denotes the methyl radical, R is an alkyl radical having 1 to 8 carbon atoms or the phenyl radical and R' is R or hydrogen. In the above formula, n is between 1 and about 50 and m is 1 to about 150. It is preferred that R and R' are methyl radicals, n is about 6 to 45 and m is 1 to about 20. A highly preferred crosslinker is $Me_3SiO(HMeSiO)_{35}SiMe_3$.

For the purposes of this invention, the crosslinker (iii) is utilized in the compositions of this invention so as to provide an approximate stoichiometric equivalence of SiH functionality for reaction with the hydroxyl functionality provided by components (i) and (ii). Thus, the molar ratio of SiH to SiOH groups may range from about 0.8 to 1.2. Preferably, this ratio is 1.0.

The siloxanes of components (i), (ii) and (iii), many of which are available commercially, are well known in the art and description of their preparation need not be detailed herein.

The condensation catalyst (component iv) can be any of those catalysts that promote the reaction between the hydroxyl endblocked polydimethylsiloxanes (components i and ii) and the siloxane crosslinker (iii). Such condensation catalysts include organometallic materials like the carboxylic acid salts of metals such as tin or organic titanates such as alkyl titanates or acyltitanates. The catalysts preferably employed in the invention are the tin salts of carboxylic acids, or the alkyl titanates. In particular, these catalysts include, but are not limited to, dibutyltindiacetate, dibutyltindilaurate, dibutyltindioctoate, stannous octoate, dimethyltindineodeconoate, tetrabutyltitanate, tetraoctadecyltitanate and tetra(2-ethylhexyl)titanate. Two highly preferred catalysts of this invention are dibutyltindiacetate and tetra(2-ethylhexyl)titanate. Typically, the catalyst is incorporated in the compositions of this invention at about 2 to 8 parts by weight for each 100 parts of components (i), (ii) and (iii), the actual amount required for any particular application being readily determined by routine experimentation.

The mold release compositions of this invention also must contain from about 5 to 95 percent by weight of an inert organic solvent (component v). This solvent serves to reduce the viscosity of the composition and facilitates the application of the composition to the shape-determining surfaces of a mold. It has been found that, when less than about 5% solvent (or no solvent) is used, the catalyzed composition reacts too quickly and forms a gel, making practical application of the composition to the surfaces of a mold difficult. Contrarily, when more than about 95% solvent is used, the cure reaction is too slow to be practical. It is preferred that from 20 to 80 weight percent of the mold release composition be such a solvent. Solvents which are to some extent hydrophobic are advantageous because they facilitate the exclusion of moisture from the compositions and help prevent premature reaction of the SiH groups of the crosslinker during storage.

Any organic solvent, or solvent mixture, that is nonreactive with the other components of the invention and sufficiently volatile to evaporate rapidly when applied to the mold surface can be employed in the invention. Generally, the preferred solvents have normal boiling points below about 150° C. The preferred solvent for use in any particular molding operation will depend on whether the mold release composition is applied to the molds at room temperature or at elevated temperatures. When room temperature molds are coated, a lower boiling solvent is generally preferred. On the other hand, it is advantageous to use higher boiling solvents when the molds are coated at elevated temperatures.

The inert organic solvent should be substantially water free to avoid reaction with the siloxane crosslinker. Preferred organic solvents include, for example, aliphatic hydrocarbons, cycloaliphatic hydrocarbons, aromatic hydro-carbons and chlorinated hydrocarbons. Commercial mixtures such as white spirit, mineral spirits, and naphtha are also suitable. Further examples of useful solvents include cyclo-hexane, toluene, xylene, methylene chloride, methylene dichloride, ethylene dichloride, carbon tetrachloride, chloroform and perchloroethylene. Other solvents such as acetone, methylethyl ketone, ethyl acetate and tetrahydrofuran, and dioxane can also be used, but are less preferred because of their somewhat more hydrophilic character.

Generally, it has been found that compositions containing about 70–80 percent by weight solvent are advantageous because they are easy to apply to the mold surfaces (via spray equipment, for example) and provide films of the appropriate thickness which have good permanence.

The above described catalysts and inert organic solvents are also well known in the art and further descriptions are considered unnecessary.

The compositions of the present invention may further contain components which do not interfere with film formation. For instance, a colorant could be added to the composition to indicate where the composition had been applied.

A highly preferred embodiment, illustrative of the compositions of the present invention, consists of 15.8 parts by weight of a linear hydroxyl endblocked dimethylsiloxane polymer having an average molecular weight of about 28,000: 2.8 parts of a hydroxyl endblocked dimethylsiloxane polymer having an average molecular weight of about 2,500: 0.46 parts of the crosslinker represented by the formula $Me_3SiO(HMeSiO)_{3.5}SiMe_3$; 0.93 part dibutyltindiacetate: and 80 parts naptha solvent.

The mold release compositions of the present invention can be prepared by mixing the hydroxyl endblocked polydimethylsiloxane polymers (components i and ii) with the nonreactive organic solvent (component iv), adding the siloxane crosslinker (iii) and then blending this mixture with the inert organic solvent. The catalyst is then added to this solution, whereupon the composition is ready for coating a mold. As far as is known, the order of mixing is not critical provided that the resulting composition is uniformly blended. However, once the catalyst has been added, the composition must be used because the pot life is then only on the order of several hours at room temperature. Without the catalyst, the above described solutions are stable and can be stored for extended periods before being used. All of the components should be free of water, but no extraordinary precautions need be taken. Typically, all that is required is that the organic solvent be relatively water free.

According to the method of this invention, the mold release compositions can be used to coat molds in a variety of molding applications, especially for the production of high water, high resiliency (HR) polyurethane foam articles.

For the purposes of this invention, HR polyurethane foam formulations are those in which the polyol is selected from highly reactive polyether triols. One such category is defined by polyether triols having at least 40 mole percent primary hydroxyl groups and having a molecular weight of about 2,000 to 8,000. Alternatively, the polyol may be a mixture of the above mentioned polyether triol and another polyether having an average of at least two hydroxyl groups wherein the polyether triol represents at least 40 percent by weight of the total polyol content. The HR polyurethane foam formulations are well known in the art and are further described, for example, in U.S. Pat. No. 4,309,508. In order to be called "high water," the HR polyurethane foam formulations must contain more than 4.0 parts by weight of water per 100 parts of total polyol. This relatively high water content is responsible for the low density (i.e., less than about 2 lbs per cubic foot) of the foamed articles produced when these polyurethane formulations are cured.

The mold release compositions can be applied to shape-determining surfaces of the mold (which is ordinarily pre-heated) by any suitable means such as spraying, brushing, dipping, or rolling. After application, solvent is driven off and the remaining silicone release coating is cured at temperatures ranging from about 130° F. to 170° F. preferably at about 150° F. Molds typically used in fabricating such polyurethane articles are fabricated from aluminum, but steel, epoxy and silicone rubber molds are also employed in the art.

After the mold has been coated with the release composition of this invention, it is filled with a high water HR polyurethane foam formulation which is cured at elevated temperature according to methods well known in the art. The resulting cured polyurethane foam article is then easily removed from the mold. Before they cure to an elastomeric, non-flowing state, the high water HR polyurethane foams are very unstable and are easily defoamed by currently employed mold release coatings. This often results in surface defects on the finished foamed article. On the contrary, high water HR polyurethane foam articles produced using molds treated according to the method of this invention have smooth surfaces which show no evidence of defoaming. Moreover, the cured release coatings of this invention allow the molds to be reused many times before recoating with additional mold release composition is necessary. When such recoating is desired, however, it is readily accomplished by repeating the above described coating and curing procedure.

EXAMPLES

The following examples are illustrative of the invention and should not be construed as being an exhaustive list of the embodiments of the invention. For this disclosure all viscosities were measured at 25° C., and all parts, ratios, and percentages are reported by weight except as noted.

Example 1

Seventeen grams of a hydroxyl endblocked polydimethylsiloxane having a molecular weight of about 28,000 and a viscosity about 4,000 cS (FLUID A) was mixed with 3 grams of a hydroxyl endblocked polydimethylsiloxane having a molecular weight of about 2,500 and a viscosity about 60 cS (FLUID B). This mixture was blended with 0.5 gram of a trimethylsiloxy endblocked polymethylhydrogensiloxane having an average degree of polymerization of about 35 (FLUID C) and subsequently diluted with 86 grams of naptha. Finally, 1.0 grams of dibutyltindiacetate catalyst was mixed in. The resulting mold release composition thus had a total solids content of 20%.

The above mold release composition was applied to the inner surfaces of a 7.5×7.5×1.8 inch aluminum box mold having a flat, removable cover plate. The mold was first pre-heated to 150° F. and the composition was sprayed onto all interior surfaces thereof. This coating was cured by placing the mold in an oven at 150° F. for about 7 minutes.

The mold, having been coated with the release composition, was then filled with a typical high water high resiliency (HR) polyurethane foam formulation having the following components in the proportions indicated:

| COMPONENT | PARTS |
| --- | --- |
| MULTRANOL 3901 | 50 |
| MULTRANOL 9151 | 50 |
| NIAX-A-107 | 0.4 |
| XDM | 0.2 |
| X-8154 | 0.2 |
| Water | 4.4 |
| DC-5043 | 1.75 |
| UL-1 | 0.008 |
| MULTRANOL E-531(ISO) | 51.6 |

This formulation produced foam having a density of approximately 1.6 pounds per cubic foot.

In the above formulation, MULTRANOL 3901 (Mobay Chemical Co., Pittsburgh, PA) is described as a polyether polypropylene polyol modified with ethylene oxide. It has a molecular weight of about 6,000 and a hydroxyl No. of about 28. MULTRANOL 9151 (Mobay Chemical Co.) is similar to the MULTRANOL 3901 but is filled with urea. NIAX-A-107 (Union Carbide Corp., Danbury, CT) is described as a tertiary amine. XDM (Air Products Corp., Allentown, PA) is described as N,N-dimethylaminoethyl morpholine. X-8154 (Air Products Corp.) is described as a tertiary amine organic salt. DC-5043 (Dow Corning Corp., Midland MI) is described as a silicone glycol copolymer. UL-1 (Witco Chemical Co., Brooklyn, NY) is described as an alkyltin mercaptide. MULTRANOL E-531(ISO) (Mobay Chemical Co.) is described as a 75/25 blend of toluenediisocyanate/diphenylmethanediisocyanate.

After the mold was filled, the cover plate was clamped in place and the polyurethane foam composition was cured by placing the mold in an air oven at 150° F. for about 5 minutes. The mold was removed from the oven, opened, and the foamed part pulled out of the mold cavity. Foam surface was defect-free and release was facile and without attendant tearing. This process was repeated till the molded parts were no longer satisfactory, in all allowing 30 such cycles which produced good quality foamed parts. A similar test, using an automobile seat arm rest production mold, resulted in 19 satisfactory molding cycles. In addition to allowing multiple releases of molded parts, the above release coating may readily be recoated with more mold release composition, which is cured thereon, to permit a like number of release cycles.

(Comparative) Examples 2-6

Using the polydimethylsiloxane fluids of Example 1 (i.e., FLUID A and FLUID B), five mold release compositions were prepared according to methods described in U.S. Pat. No. 4,534,928, cited supra, and each was diluted with naptha to a total solids concentration of 20% as follows.

| Component | (Comparative) Example | | | | |
| --- | --- | --- | --- | --- | --- |
| | 2 | 3 | 4 | 5 | 6 |
| FLUID A | 17 g | 17 g | 17 g | 17 g | 16.8 g |
| FLUID B | 3 | 3 | 3 | 3 | 3.2 |
| Methyl-trimethoxysilane | 5 | 5 | 5 | 10 | 10 |
| Tin Octoate | 0.8 | — | — | — | — |
| Tetraisopropyl-titanate | — | 0.8 | — | 0.8 | — |
| Dibutyltin-diacetate | — | — | 0.8 | — | — |
| Tetra(2-ethylhexyl)-titanate | — | — | — | — | 0.7 |

The above solutions were sprayed onto the walls of the aluminum box mold and cured, as in Example 1. The release properties were evaluated using the above described high water HR polyurethane formulation with the following results. (Comparative) Example 2 contained gels in the mold release composition and the molded foam stuck to at least one surface of the mold. (Comparative) Example 3 induced defoaming of the polyurethane formulation. (Comparative) Example 4 also induced defoaming of the polyurethane formulation and the molded foam stuck to the mold. (Comparative) Example 5 allowed only five satisfactory molding cycles before the foam part tore during removal from the mold. Similarly, (Comparative) Example 6 allowed 12 satisfactory cycles before foam tore. In all of these comparative examples, the molded foam parts had significant surface defects in addition to the above noted problems.

These comparative examples show that, even when a blend of high and low molecular weight polydimethylsiloxanes are employed, using an alkyltrialkoxy cure agent does not produce satisfactory results when the relatively unstable high water HR polyurethane formulations are molded.

(Comparative) Example 7

A mold release composition similar to Example 1 was prepared wherein an acetoxy cure system was employed according to methods disclosed in U.S. Pat. No. 4,681,714 to Lopes et al., cited supra, as follows.

| | |
|---|---|
| FLUID A | 17 g |
| FLUID B | 3 |
| 50/50 mixture of methyltriacetoxysilane and ethyltriacetoxysilane | 2.5 |
| Dimethyltin-dineodeconoate | 0.1 |

This composition was applied to the mold from a 10% solution in methylene chloride, cured and evaluated for release, as described above. The resultant foam parts showed "pitting" and, after the third molding cycle, defoaming, which corresponds to "pitting" on a gross scale.

Again, this comparative example shows that, even when the high and low molecular weight polydimethylsiloxanes are used, the cure system employed is critical in obtaining good foam articles when the high water HR polyurethane formulations of the instant method are used.

(Comparative) Examples 8–10

Three release compositions were prepared according to methods of Canadian Patent No. 624,114, cited supra, wherein each composition was diluted to 20% total solids in methylene chloride, as follows.

| Component | (Comparative) Example | | |
|---|---|---|---|
| | 8 | 9 | 10 |
| Hydroxyl endblocked polydimethylsiloxane (M.W. about 500,000) | 8 g | 9.7 g | — |
| Hydroxyl endblocked polydimethylsiloxane (M.W. about 40,000) | — | — | 9.7 g |
| Ethylpolysilicate | 2 | — | — |
| FLUID C (see Example 1) | — | 0.3 | 0.3 |
| Dibutyltin-diacetate | 0.1 | — | — |
| Dibutyltin-dioctoate | — | 0.1 | 0.1 |

As above, these compositions were coated and cured on the mold surfaces and evaluated for release of the high water HR polyurethane formulation with the following results. (Comparative) Eaxmple 8 induced defoaming. (Comparative) Example 9 allowed three good foam parts to be easily released while the fourth required considerable force in order to pulled from the mold. (Comparative) Example 10 produced one good foam part and thereafter induced considerable defoaming and excessive cell size.

These comparative examples demonstrate that, even when the cure system of the present invention is employed, it is critical that a mixture of a high and a low molecular weight hydroxyl endblocked polydimethylsiloxane is also used when release of the high water HR polyurethane foams is desired.

(Comparative) Example 11

A mold release composition was prepared according to methods described in U.S. Pat. No. 4,244,912, cited supra, as follows. Seventeen grams of a dimethylvinylsiloxy endblocked polydimethylsiloxane having a viscosity of about 400 cP was mixed with 6.6 grams of a solution containing about 67% solids in xylene of a resin copolymer having $(CH_3)_3SiO_{\frac{1}{2}}$, $(CH_3)_2(CH_2=CH)SiO_{\frac{1}{2}}$ and $SiO_{4/2}$ siloxane units wherein the mole ratio of the sum of the methyl- and vinyl-bearing siloxane units to the $SiO4/2$ siloxane units was about 0.7 and the vinyl content was about 1.8%. To this mixture was added 0.36 gram of FLUID C (see Example 1) and 0.2 gram of a chloroplatinic acid complex of divinyltetramethyldisiloxane diluted with dimethylvinylsiloxy endblocked polydimethylsiloxane to provide 0.65 weight percent platinum (prepared according to Example 1 of U.S. Pat. No. 3,419,593 to Willing). This composition was diluted with naptha to a total solids concentration of 20% in naptha. The composition was used to coat a mold, cured and evaluated for release of polyurethane foam, as above. Although this comparative example composition resulted in 48 satisfactory release cycles, when it was recoated, a very slow cure of the release composition was obtained (more than 24 hours). This inhibition of cure, presumably due to components in the polyurethane formulation, make such release compositions impractical in commercial operations.

I claim:
1. A composition consisting essentially of:
   (i) a hydroxyl endblocked polydimethylsiloxane having a molecular weight of about 20,000 to 500,000:
   (ii) a hydroxyl endblocked polydimethylsiloxane having a molecular weight of about 1,000 to 5,000, the weight ratio of (i) to (ii) being about 3:1 to 19:1;
   (iii) a siloxane crosslinker having, on average, at least three SiH groups per molecule and selected from siloxanes having the formulae

$R_2R'SiO(Me_2SiO)_m(HMeSiO)_nSiR'R_2$ or $R_2R'SiO(HMeSiO)_nSiR'R_2$ wherein in each formula Me denotes the methyl radical, R is an alkyl group having 1 to 8 carbon atoms or the phenyl radical, R' is R or hydrogen, m is 1 to about 150 and n is 1 to about 50, said crosslinker being present in such proportion so as to provide an approximate stoichiometric equivalence of SiH functionality for reacting with the total of the hydroxyl functionality provided by components (i) and (ii):
   (iv) sufficient condensation catalyst to promote reaction of (i) and (ii) with (iii): and
   (v) an inert organic solvent, said mold release composition containing from about 5 to 95 weight percent of said solvent.
2. The composition according to claim 1, wherein said hydroxyl endblocked polydimethylsiloxane (i) has a molecular weight of about 20,000 to 100,000 and said hydroxyl endblocked polydimethylsiloxane (ii) has a molecular weight of about 2,000 to 3,000.

3. The composition according to claim 2, wherein R and R' are each the methyl radical, n is 6 to 45 and m is 1 to 20.

4. The composition according to claim 3, wherein said weight ratio of component (i) to component (ii) is 4:1 to 9:1.

5. The composition according to claim 4, wherein said inert organic solvent constitutes 20 to 80 weight percent of said composition.

6. The composition according to claim 5, wherein component (iii) is $Me_3SiO(HMeSiO)_nSiMe_3$ in which Me denotes the methyl radical and n is about 35.

7. The composition according to claim 6, wherein said hydroxyl endblocked polydimethylsiloxane (i) has a molecular weight of about 28,000, said hydroxyl endblocked polydimethylsiloxane (ii) has a molecular weight of about 2,500 and said weight ratio of (i) to (ii) is about 5.7:1.

* * * * *